United States Patent [19]
Fujii et al.

[11] Patent Number: 6,087,007
[45] Date of Patent: *Jul. 11, 2000

[54] HEAT-RESISTANT OPTICAL PLASTIC LAMINATED SHEET AND ITS PRODUCING METHOD

[75] Inventors: Sadao Fujii; Kenji Matsumoto, both of Kobe, Japan

[73] Assignee: Kanegafuchi Kagaku Kogyo Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/640,950
[22] PCT Filed: Sep. 30, 1994
[86] PCT No.: PCT/JP94/01628
  § 371 Date: May 16, 1996
  § 102(e) Date: May 16, 1996
[87] PCT Pub. No.: WO96/10483
  PCT Pub. Date: Apr. 11, 1996
[51] Int. Cl.$^7$ ............................ B32B 27/08; B32B 27/36
[52] U.S. Cl. .......................... 428/412; 156/242; 156/246; 156/308.2; 156/309.6; 349/119; 428/1.6; 428/480
[58] Field of Search ..................................... 156/242, 246, 156/308.2, 309.6; 349/119; 428/412, 480, 1.6

[56] References Cited

U.S. PATENT DOCUMENTS 5,227,458  7/1993  Freitag et al. ........................... 528/196

FOREIGN PATENT DOCUMENTS

| | | |
|---|---|---|
| 0 193 176 | 9/1986 | European Pat. Off. . |
| 0 376 696 | 7/1990 | European Pat. Off. . |
| 60-208242 | 10/1985 | Japan . |
| 61-291131 | 12/1986 | Japan . |
| 2-162040 | 6/1990 | Japan . |
| 3-39249 | 2/1991 | Japan . |
| 3-128241 | 5/1991 | Japan . |

OTHER PUBLICATIONS

Kenichi et al., "Heat Resistant, Transparent and Multilayer Plastic Sheet", *Patent Abstracts of Japan*, vol. 15, No. 253, (M1129) and JP Publication No. 03082530 published Apr. 8, 1991, Abstract.

WPI, Section Ch, Week 8705, "Mat Films for Keyboards, Displays, Tracking Films, etc.", Derwent Publications Ltd., London, GB, Class A23, Appl. No. 87–032203, Publ. No. JP61287741A on Dec. 18, 1986, Abstract.

Hitoshi et al., WPI, Section CH, Week 9151, "Electrode Substrate for Liquid Crystal Display Panel," Derwent Publications Ltd., London, GB, Class A28, Appl. No. 91–374148, Publ. No. JP3252625A on Nov. 11, 1991, Abstract and Drawing.

WPI, Section Ch, Week 8541, "Transparent Electroconductive Film," Derwent Publications Ltd., London, GB, Class A28, Appl. No. 85–252815, Publ. No. JP60167208 on Aug. 30, 1985, Abstract.

*Primary Examiner*—D. S. Nakarani
*Attorney, Agent, or Firm*—Armstrong, Westerman, Hattori, McLeland & Naughton

[57] ABSTRACT

An optical plastic laminated sheet excellent in heat resistance and transparency is disclosed, which comprises a laminate of at one first layer of an optically transparent polymer and a second layer of an optically transparent polymer having a lower glass transition temperature than that of the first layer polymer.

The laminated sheet possesses excellent impact strength and rigidity as well as excellent optical properties and is useful as a substance in the field of photoelectronics.

12 Claims, No Drawings

HEAT-RESISTANT OPTICAL PLASTIC LAMINATED SHEET AND ITS PRODUCING METHOD

TECHNICAL FIELD

The present invention relates to an optically transparent and heat-resistant plastic laminated sheet, its producing method and a heat-resistant transparent substrate using the aforementioned laminated sheet.

BACKGROUND ART

With rapid progress of the electronic techniques lately, the field of photoelectronics such as liquid crystal display elements, electroluminescent display elements and photoelectronic transfer elements for solar cells has been spreading steadily.

In such fields, photoelectronic elements have been supplied to various uses generally for such elements placed on a glass substrate having a transparent conductive layer.

Since, however, glass is problematic due to its insufficient mechanical strength, especially brittleness, this resulting in lowering of durability of elements and, to cope with it, substrates specially treated like those of tempered glass are now being often used. When such elements are incorporated into portable devices in particular, their weight is increased due to the large specific gravity of glass. Therefore, thinning of the glass substrate is required and substrates 0.4 mm or so in thickness are now feasible. However, its brittleness still remains and problems such as lowering the yield due to breaking in the process or lowering of impact strength of the elements remain unsolved.

Thus, strengthening and weight-saving of substrates are strongly desired and from the viewpoints of lightness, impact strength and interchangeability with glass, generally preferred are optically transparent (i.e. 80% or more in ray transmission and 5% or less in haze) plastic substrates having 0.2–0.5 mm thickness and having a reasonable rigidity.

With respect to the process temperature required for the formation of photoelectronic elements taken into consideration, however, a high heat resistance of not less than 180° C., preferably not less than 200° C. are required and, when application to liquid crystal elements is considered, a low retardation preferably of not more than 50 nm, more preferably, not more than 20 nm, is required. Meanwhile, when a plastic film or sheet is made, its molecules are subjected to orientation, and it is particularly difficult to obtain a film or sheet which is low in retardation by a melting method, especially when the material used is high in heat resistance. For example, when a material used is relatively low in heat resistance such as polycarbonates, it is even possible to obtain a sheet low in retardation of not more than 50 nm which is usable for the production of liquid crystal display elements, but no low-retardation sheet is obtainable from a material of not less than 180° C. in glass transition temperature such as polyarylates.

Meanwhile, in the case of supernematic liquid crystal displays (STN-LCD), it is a general practice to use a high molecular film (phase difference film) with its retardation, which is represented by the product of birefringence and thickness, controlled to a specific value stuck to a glass substrate in order to improve its display quality. When the substrate is made of a plastic, features not obtained with a glass substrate such as imparting the phase difference function thereto for cost saving are expected. Thus, particularly desired is a plastic substrate which is heat-resistant with its retardation well controlled to be not less than 100 nm, preferably in a range of about 100–700 nm.

For that purpose, proposed is a method of using heat-resistant high molecular materials such as polyarylates, polysulfones, polyethersulfones, and polyetheretherketones made in film form by a solvent casting method and used in the form of the so-called plastic liquid crystal cells etc. (Japanese Laid-open Patent Publication No. 119321/'84, Japanese Laid-open Patent Publication No. 167208/'85, Japanese Laid-open Patent Publication No. 147721/'85, Japanese Patent Publication No. 41539/'86, U.S. Pat. No. 4,623,710), but such plastic substrates are filmy some 0.1 mm in thickness. These are, however, more flexible and less rigid than glass, hence cannot be used in common in processes in which glass substrates are used. Thus, it is not proper for the purpose of eliminating the defect of glass substrate by the use of any existing glass substrate process, and the development of a new process is required.

In order to improve the rigidity of such film, it is considered to increase the film thickness, but if the increase of the film thickness is intended by a solvent casting method, defects such as bubbling are likely to occur and, worse, marked lowering of producibility makes its application to commercial production difficult, the upper limit thus being about 200 $\mu$m. When the increase of film thickness is intended by a melt-extruding method, optical isotropy is not only lost but, surface smoothness or external appearance is bad due to die lines formed during molding, consecutively, it is difficult to use such films as liquid crystal display substrates.

Meanwhile, the possibility of film-forming essentially low birefringent plastics such as polymethyl methacrylates and modified polyolefins or curing-type plastics such is crosslinked acryl resins or epoxy resins as disclosed in Japanese Laid-open Patent Publication No. 194501/'94 for this purpose. However, former lacks in heat resistance required for glass process, while the latter is problematic with its poor producibility and is not suitable for mass-production. It is also possible to make a sheet by laminating the aforementioned heat resistant optical film, but there is no adhesive excellent in both heat resistance and reliability, and a high treating temperature is required for heat lamination which causes deterioration in properties such as denaturation and tinting of resins.

Thus, there has been found to date no commercially usable materials having the rigidity and the heat resistance required for having interchangeability with the glass process, and also being excellent in impact strength as well as in optical properties such as high transparency and low retardation.

In view of such actual situation, the present invention provides a good heat-resistant optical plastic laminated sheet excellent in heat resistance and optical properties and having good mass-producibility, being thus well suited for use as photoelectronic elements.

After intensive studies for attaining the aforementioned objects, the present inventors discovered that a laminated structure comprising a layer having a high heat resistance and another layer excellent in physical properties at room temperature provides a good optical plastic laminated sheet having a high rigidity and excellent optical properties as well as high heat resistance, and arrived at the present invention.

DISCLOSURE OF THE INVENTION

The present invention relates, in a first aspect, to an optically plastic laminated sheet comprising a laminate of at least one first layer of an optically transparent polymer and a second layer of an optically transparent polymer having a lower glass transition temperature than that of the first layer.

The present invention relates, in a second aspect, to a method of producing an optical plastic laminated sheet excellent in heat resistance and transparency, wherein a film of an optically transparent polymer constituting a first layer and another optically transparent film having a lower glass transition temperature than that of the first layer polymer, constituting a second layer are laminated together by heating.

The present invention relates, in a third aspect, to a heat-resistant transparent substrate to be used as photoelectronic elements in which the aforementioned optical plastic laminated sheet is used.

BEST MODE OF PRACTICING THE INVENTION

The present invention relates to a sheet comprising a first layer of a highly heat-resistant material having a higher glass transition temperature and a second layer of a material having a lower glass transition temperature.

The optically transparent polymer constituting the first layer means what is not less than 80% in ray transmission and less than 5% in haze, a highly heat-resistant thermoplastic resins called engineering plastics such as polyarylates, polycarbonates, polysulfones, polyethersulfones and polyvinyl alcohols. The first layer may be a single layer or a plurality of layers of not less than two.

Polyarylates or polycarbonates having aromatic groups in the principal chain are highly heat resistant and transparent and are suited and preferred for a film or sheet (called "film" hereinafter). Details of the aforementioned polymers are described in Japanese Laid-open Patent Publication No. 73021/'82, Japanese Laid-open Patent Application No. 13583/'89, Japanese Laid-open Patent Publication No. 88634/'90, and Japanese Laid-open Patent Publication No. 23720/'90. The glass transition temperature of such polymers is not less than 160° C., preferably not less than 180° C. and more preferably not less than 200° C.

The first layer is laminated on either or both sides of the second layer having a lower glass transition temperature than that of the first layer, which ensures against thermal deformation of the second layer when the laminated sheet is subjected to a high temperature. The thickness of the first layer is determined by the thickness of the laminated sheet, the required heat resistance and form stability but usually it is 20–80% of the thickness of the laminated sheet. When the aforementioned laminated sheet is simply used as a substrate for a liquid crystal display device, the sheet is required to be low in retardation, generally preferred to be not more than 50 nm, more preferably, not more than 20 nm, although it depends on the kind of the liquid crystal display device. If the phase difference function is imparted to the aforementioned sheet, it may easily be done by doing lamination after applying the predetermined retardation to at least one layer to be laminated. Generally, retardation is required to be not less than 100 nm and preferably not less than 300 nm. When the heat stability of the resulting phase difference laminated sheet is intended, it is advisable to impart a given degree of retardation to the first layer having a high heat resistance.

The predetermined retardation is imparted by orienting the aforementioned high molecular material. Generally, it may be done by mono- or biaxial stretching a high molecular film of less optically anisotropic polymers such as polyarylates, polycarbonates, polysulfones, polyether sulfones, polyvinyl alcohols and the like. These films can be made by any of the known film-making methods, but most preferred is a solvent casting method, with the finished surface appearance and optical properties taken into consideration.

The retardation depends on the film thickness and the degree of orientation of molecules, and the orientation of molecules depends largely on the stretching conditions. For the precise control of retardation, it is preferable to make the first layer relatively thin and to have the control width for stretching conditions as large as possible. For this purpose, it is advisable to select the thickness of the first layer preferably from a range of 20–150 μm and more preferably from a range of 40–100 μm. As seen from Japanese Laid-open Patent Publication No. 160204/'90 or Japanese Laid-open Patent Publication No. 85519/'91, it is possible to use properly any special material with its refractive index in the perpendicular (film thickness) direction different from that in any in-plane direction. In this case as well, the first layer may not only be a single layer but also a plurality of layers of not less than two.

As the material constituting the second layer, generally used is what is low in birefringence and is easy to make into a thick film and still another requirement is that its heat resistance is lower than that of the first layer. When the second layer is heated to a temperature above the glass transition temperature in the lamination process of a heat-bonding method or the like, it is also possible to use a material not having low birefringence and in such a case the initial optical properties required of the second layer are sizably mitigated. The glass transition temperature of any material constituting the second layer is naturally dependent upon the required level of heat resistance but generally it is enough if it is not less than 100° C., but it is preferred to be not less than 140° C. and not less than 20° C. lower than that of the glass transition temperature of the material constituting the first layer, and it is still more preferable if it is not less than 40° C. lower than that. The heat resistance of the laminated plastic sheet of the present invention largely depends on that of the first layer. The second layer is composed of a single layer or a plurality of layers of not less than two.

The material of the second layer is preferred to be compatible with that of the first layer and is to be chosen from the optimum plastic materials. The second layer contributes largely to the rigidity at room temperature of the laminated sheet. This layer is protected from thermal deformation by the first layer. Accordingly, even when heated at a temperature above the glass transition temperature, either or both sides thereof are protected by the first layer which is high in glass transition temperature and has its form retained without fluidizing even under pressure-caused stress. The required thickness of the second layer is determined, like that of the first layer, by the properties required of the laminated sheet, but it is 80–20% of the entire thickness of the laminated sheet.

Although the plastic laminated sheet of the present invention can be molded by a melt co-extrusion method applicable to individual plastics constituing each layer, it is also possible to attain a high-grade plastic laminated sheet after forming each layer as a film of the required thickness individually by a solvent casting method or a melt-extrusion method. Lamination by the use of an adhesive is also possible but in such a case, careful selection of the adhesive is required lest the heat resistance of the laminated sheet should be affected. Lamination by heating is preferred in respect of properties at high temperatures being taken into account. In this case, selection of the materials is to be done with the compatibility of the first and the second layers taken into due consideration.

When polyarylates or polycarbonates are used as a material of the first layer, polyesters, polyarylates, polycarbonates or the like with its relatively low glass transition temperature are suitable materials for the second layer. Polycarbonates comprising bisphenol A and terephthalic acid are being widely used as an engineering plastic and are suitable materials of the second layer, since they have a moderate glass transition temperature of about 150° C. and good compatibility with the first layer, in addition to properties and cost.

Since the heat resistant optical plastic laminated sheet of the present invention is, as mentioned above, composed of the first layer and the second layer laminated together, it is a feature to obtain a heat resistant thick film at a reasonable cost, utilizing the merit of the solvent casting method enabling the production of a thin film excelled in optical properties. Also when a laminated sheet is formed by lamination, the film obtained by the solvent casting method is usable as the high heat-resistant layer (first layer) excelled in optical properties and surface smoothness. Further, since materials relatively low in glass transition temperature and excelled in optical properties are produced easily with high producibility by the melt-extrusion method, it is also possible to use the melt-extrusion film as the second layer for saving of the cost of the laminated sheet.

Since, according to the heat lamination method, the second layer is heated to above the glass transition temperature in the course of lamination, the film formed is subjected to the effect of heat annealing. Accordingly, the birefringence the single film possessed is thereby lowered and improved, and the resulting laminated sheet has a feature of its retardation smaller than the sum of each retardation of each film. One of the methods of proper hot lamination is heating by a heat roll or a belt. Although the required heating varies depending upon materials to be laminated, it is preferable to set a temperature higher than the glass transition temperature of the material of the second layer and lower than the glass transition temperature of the material of the first layer. Hot lamination may also be done by first preliminarily pressing at a relatively low temperature and then regularly pressing at the laminate temperature, i.e, conducting heating in a plurality of steps. It may also be possible to use a vacuum laminating system to ensure against forming bubbles at the time of heat lamination.

In the plastic laminated sheet of the present invention of the aforementioned structure, the sheet thickness is preferred to be 0.2–1 mm, and more preferably 0.3–0.7 mm for the desired rigidity and for keeping the desired common usability with glass or interchangeability therewith in the process. As to optical properties, the total ray transmission is preferred to be not less than 80%.

The plastic laminated sheet of the present invention, allows, like glass, secondary processing for photoelectronic substrates such as transparent conductive processing, but as processing conditions, it is necessary to find out optimum conditions from the conditions now adopted for processing of transparent conductive films. Also, since, unlike glass substrate, its barrier performance against oxygen, water vapor etc. is poor, organic gas barrier processing by the use of ethylenevinylalcohol copolymers or polyvinylidene chlorides, or inorganic gas barrier processing by the use of silica alumina or the like has to be done as necessary.

Meanwhile, as mentioned above, it is possible to impart, in advance, some function to at least one of the first layers.

For example, it is also possible to obtain a plastic laminate sheet integrated with a phase difference film by pre-stretching the film constituting the first layer and imparting thereto a predetermined birefringence, followed by lamination thereof. Since, in this case, the phase difference film constituting the first layer has a high glass transmition temperature, there is no risk of undue lowering of retardation even in the case of heat lamination, a highly retardation-controlled sheet being thus attainable.

In cases where the first layer made of a phase difference film is provided on both sides of the second layer and the optical axes of the phase difference films are kept parallel, the phase difference of the resulting sheet is the sum thereof. When the first layers are so arranged, it is possible to ensure against unfavorable deformation of the resulting sheet such as warping compared with the cases where phase difference is caused to occur in one first layer on either side. As to the phase difference films constituting the first layer, it is also preferred to have their optical axes properly crossed for the improvement of properties such as contrast of the resulting liquid crystal display device. Normally, STN liquid crystal display devices require a plurality of phase difference films besides the substrate but, when such arrangement is adopted, the construction of the liquid crystal display device can be made simpler since the substrate materials have the functions of a plurality of phase difference films. The angle of the relative optical axes of a pair of the first layers is determinable in relation to the parameters for designing the liquid crystal display device. According to the laminated sheet of the present invention, what has the required relative angle is obtainable with ease.

The present laminated sheet has no limitation with the provision of layers other than the first and the second layers.

A pair of the first layers may or may not be same in retardation. If necessary, even the kind of materials constituting the first layer may be varied.

It is also possible to use as the first layer a film with a transparent and conductive layer on its surface so that even a transparent and conductive plastic laminated sheet may be prepared. Further, it is also possible to provide a phase difference film as one of the first layers and a conductive film as another thereof, to thus obtain an integral laminated sheet having both phase difference feature as well as conductive feature.

From a viewpoint of heat resistance and optical properties, the plastic laminated sheet of the present invention is usable in common with or interchangeable with glass, being thus widely useful as the substrate for photoelectronic elements. Moreover, it is excelled in impact strength and light weight and is particularly suited as the substrate for liquid crystal display elements which are required to be progressively greater in area.

The present invention will be described in greater detail by way of examples below, but the present invention is in no manner limited thereto.

EXAMPLE 1

As the first layer material, an A4-size transparent polyarylate film (Elmech F-1100: registered trademark of Kanegafuchi Kagaku Kogyo Kabushiki Kaisha) made by the solvent casting method with a glass transition temperature of 215° C., a retardation of 10 nm and a thickness of 75 μm was used and as the second layer material, a transparent polycarbonate film, containing bisphenol A-terephthalic acid at the principal chain, made by the solvent casting method, having a glass transition temperature of 150° C., a retardation of 13 nm and a thickness of 120 μm was used, the polycarbonate film was placed between two polyarylate films and tentative pressing was made by the use of a vacuum laminator at 145° C. The tentatively bonded set of films was then inserted between glass plates, heated to 200° C., and the regularly bonded laminated sheet, 270 μm thick, was thus obtained.

The softening temperature of the obtained laminated sheet was 245° C. as determined by TMA analysis, being thus substantially equal to that of a pure polyarylate film. Meanwhile, the softening temperature of polycarbonate was 180° C. The prepared laminated sheet well retained its form even when pressed at 200° C. with a force of 20 kg/cm$^2$, and had 20 nm in retardation, a high heat resistance and a good optical isotropy. The surface roughness was 0.028 μm on the average, the ray transmission was 90% and the haze was 0.3%.

EXAMPLE 2

Using a heat-resistant polycarbonate containing 1,1-bis-(4-hydroxyphenyl)-3,3,5-trimethyl cyclohexane and bisphenol A as phenol components (glass transition temperature: 206° C., Apec HT KUI-9371: registered tradmark of Bayer A. G.) as a material, a polycarbonate film 75 μm thick and 8 nm in retardation was obtained by the solvent casting method. With this film as the first layer, a regularly bonded laminated sheet 270 μm thick was obtained in the same way as in Example 1.

The softening temperature of the laminated sheet thus prepared was 230° C. as determined by TMA analysis, this being substantially equal to that of polycarbonate alone used as the first layer. The prepared laminated sheet well retained its form even when pressed at 190° C. with a force of 20 kg/cm$^2$ and had an excellent heat resistance and an optical isotropy, being 19 nm in retardation. The ray transmission was 89% and the haze was 0.4%.

EXAMPLE 3

A 530 μm thick laminated sheet was obtained by melt-bonding two sheets of polyarylate films to the second layer in the same way as in Example 1, except that as the second layer, a polycarbonate film (glass transition temperature: 150° C., retardation: 150 nm) 400 μm in thickness was used.

The softening temperature was 245° C. and the retardation after pressing at 200° C. with a force of 20 kg/cm$^2$ was 19 nm. Its ray transmission was 90% and the haze was 0.3%.

EXAMPLE 4

A phase difference film 380 nm in retardation and 215° C. in glass transition temperature was obtained by free-end longitudinal monoaxial stretching of a 75 μm thick polyarylate film prepared by the solvent casting method. This phase difference film and an unstretched polyarylate film 75 μm thick (glass transmission temperature: 215° C.) were used as the first layer materials and a 200 μm thick polycarbonate film 20 nm in retardation and 150° C. in glass transition temperature made by the melt-extrusion method was used as the second layer material, a 340 μm thick laminated sheet with the phase difference film integrated was obtained by melt-bonding in the same way as in Example 1.

The laminated sheet thus obtained had a retardation of 372 nm. The in-plane distribution of retardation was 7 nm, being thus quite satisfactorily uniform. The ray transmission was 88% and the haze was 0.9%.

EXAMPLE 5

A 75 μm thick phase difference film having a retardation of 410 nm was obtained by free-end longitudinal monoaxial stretching of a film of heat-resistant polycarbonate used in Example 2. Using this phase difference film and an unstretched 75 μm thick heat-resistant polycarbonate film as materials of the first layer and a 200 μm-thick polycarbonate film 150° C. in glass transition temperature and 20 μm in retardation as a material of the second layer, melt-bonding was carried out in the same way as in Example 1 and a 340 μm thick laminated sheet with the phase difference film integrated was obtained.

The laminated sheet had a retardation of 392 nm. The in-plane distribution of retardation was 12 nm, being quite satisfactorily uniform. The ray transmission was 89% and the haze was 0.8%.

EXAMPLE 6

A 75 μm thick polyarylate film (glass transition temperature: 215° C.) having on one side an SiOx gas barrier layer and an ITO transparent conductive layer formed successively and having 60 Ω/□ in surface resistance, and the polyarylate film described in Example 1 were used as materials of the first layer and a 200 μm-thick polycarbonate film having a glass transition temperature of 150° C. and a retardation of 20 nm formed by the melt-extrusion method, used in Example 4 was used as a material of the second layer, the polycarbonate film was put between the aforementioned two kinds of polyarylate films and melt-bonding was carried in the same way as in Example 1 and a plastic laminated sheet having a transparent conductive layer on the surface was obtained.

The resulting laminated sheet was 350 μm thick, its surface resistance being 45 Ω/□.

EXAMPLE 7

The polyarylate phase difference film described in Example 4 and the transparent conductive polyarylate film described in Example 6 were used as materials of the first layer respectively, and 200 μm thick polycarbonate film having a glass transition temperature of 150° C. and a retardation of 20 nm molded by the melt-extrusion method used in Example 4 was used as a material of the second layer, melt-bonding was carried out in the same way as in Example 1 and a plastic laminated sheet having a transparent conductive layer as well as a phase difference film on the surface was obtained.

The resulting laminated sheet was 347 μm in thickness and and had a retardation of 369 nm and a surface resistance of 45 Ω/□.

EXAMPLE 8

The plastic laminated sheet obtained in Example 1 was used, an SiOx layer 500 Å and an ITO layer 1000 Å were successively formed thereon by a vacuum sputtering method and a heat-resistant transparent substrate having a barrier layer and a transparent conductive layer was prepared.

The resulting heat-resistant transparent substrate had a surface resistance of 52 Ω/□ and an oxygen permeability of not more than 0.7 cc/m$^2$/day.

EXAMPLE 9

A 58 μm thick-polyarylate transparent film (Elmech F-1100: registerd trademark of Kanegafuchi Kagaku Kogyo Kabushiki Kaisha) 215° C. in glass transition temperature and 10 nm in retardation, formed by the solvent casting method, was monoaxially stretched and a phase difference film 380±3 nm in retardation was obtained. Using this phase difference film as the first layer and as the material of the second layer 400 μm-thick polycarbonate film 150° C. in glass transition temperature and 30 nm in retardation formed by the melt-extrution method, the polycarbonate film was put between the two sheets of aforementioned polyarylate phase difference films so that their optical axes were intersected at 70°, then subjected to the melt-bonding. The securely bonded laminated sheet 550 μm thick and 300 mm×400 mm in size was obtained.

The two sheets of films forming the first layer had retardation of 388±5 nm and 390±4 nm, respectively. The ray transmission was 89% and the haze was 1.5%.

EXAMPLE 10

The polyarylate transparent film used in Example 9 was monoaxially stretched and a phase difference film 200±3 nm in retardation was obtained. Using this phase difference film as the first layer and the polycarbonate film used in Example 9 as a material of the second layer, the aforementioned polycarbonate film was put between two sheets of polyarylate phase difference films so that their optical axes were parallel, and then melt-bonded.

The retardation of the resulting laminated sheet was 388±5 nm and the in-plane distribution of retardation was quite satisfactory, being less than 3 nm per 1 cm. The ray transmission was 88% and the haze was 1.2%.

EXAMPLE 11

As a material of the second layer, a 400 μm thick polycarbonate film having a glass transition temperature of 150° C. and a retardation of 130 nm, molded by the melt-extrusion method was used and was melt-bonded to two sheets of polyarylate films described in Example 9 in the same way as in Example 9, and a 550 μm thick laminated sheet was obtained.

The retardation values of the two first layers constituting the obtained laminated sheet were 390±4 nm and 385±3 nm, respectively, and the initial retardation of the second layer had no major influence on the retardation of the obtained laminated sheet and its optical performance was similar to that shown in Example 9. The ray transmission was 89% and the haze was 1.5%.

EXAMPLE 12

A 55 μm-thick polyarylate phase difference film, prepared by the solvent casting method, having a glass transition temperature of 215° C. and a retardation of 420 nm was used as the first layer and the polycarbonate film used in Example 9 was used as the second layer. The second layer was sandwiched between two sheets of films of the first layer with their optical axes alternatively crossed at 45° and a laminated sheet 530 μm thick was obtained by melt-bonding. The retardation values of the two sheets of the first layer after lamination were 403 nm and 409 nm, respectively. The ray transmission was 88% and the haze was 1.6%.

EXAMPLE 13

A heat-resistant polycarbonate (glass transition temperature: 206° C., Apec HT KUI-9371: registered tradmark of Bayer A.G.) containing as phenol components 1,1-bis-(4-hydrophenyl)-3,3,5-trimethylcyclohexane and bisphenol A was used and a 75 μm thick heat-resistant polycarbonate film (A4-size, retardation: 8 nm) was obtained by the solvent casting method. Further, this film was subjected to the free-end longitudinal monoaxial streching to obtain a phase difference film having a retardation of 410 nm.

This phase difference film was used as the first layer and a 200 μm thick polycarbonate film formed by the melt-extrusion method having a retardation of 20 nm was used as the second layer, and a 340 μm thick laminated sheet with phase difference film integrated was obtained by the melt-bonding in the same way as in Example 9. After lamination, the retardation values of the two sheets of the first layer were 392 nm and 390 nm respectively. The inplane distribution of retardation was 12 nm, being thus quite uniform. The ray transmission was 88% and the haze was 1.5%.

EXAMPLE 14

The monoaxially stretched polyarylate phase difference film used in Example 9 was used and on either side thereof, a 500 Å thick gas barrier layer comprising an SiOx was formed by the surface sputtering method. As the material of the second layer, the polycarbonate film used in Example 13 was used, the polycarbonate films was sandwiched between the surfaces having no gas barrier layers of the two sheets of polyarylate films and subjected to the melt-bonding in the same way as in Example 9, and a birefringent plastic laminated sheet with a barrier layer on its surface was thus obtained. This sheet had 350 μm in thickness, not more than 0.7 cc/m²/day in oxygen permeability and its surface covered by the barrier layer showed a good chemical resistance.

EXAMPLE 15

The laminated sheet obtained in Example 9 was used, on the surface of either of the layers of which an SiOx layer 500 Å in thickness and an ITO layer 1,500 Å in thickness were successively formed and a heat-resistant and transparent substrate having both the barrier layer and the transparent conductive layer was thus obtained. This laminated sheet had 30 Ω/□ in surface resistance and not more than 0.8 cc/m²/day in oxygen permeability. The retardation of the laminated sheet remained unaltered before and after sputtering and a birefringent transparent conductive sheet having a good optical performance was obtained.

INDUSTRIAL APPLICABILITY

As mentioned above, the present invention provides a heat resistant transparent plastic laminated sheet having excellent impact strength and rigidity. The plastic laminated sheet of the present invention is quite useful as a glass-substituent optical substrate in the field of photoelectronics, especially in the field of liquid display devices.

What is claimed is:

1. A photoelectronic element including a heat-resistant transparent electrically conductive substrate, comprising a laminate of a second layer and two first layers on both sides of the second layer, and an electrically conductive layer formed on a side of one of the first layers, the side being opposed to the second layer, said first layer being an optically transparent amorphous polymer obtained by a solvent casting method and having a glass transition temperature of not less than 180° C., said second layer polymer being an optically transparent amorphous polymer having a glass transition temperature of not less than 140° C. which is lower by not less than 20° C. than that of the glass transition temperature of said first layer polymer, said substrate having a retardation of not more than 50 nm and a ray transmission of not less than 80%.

2. The photoelectronic element according to claim 1, wherein the first and second layers are directly laminated.

3. The photoelectronic element according to claim 1, wherein the first layer is made of an optically transparent polyarylate or polycarbonate, having aromatic groups in a principal chain.

4. The photoelectronic element according to claim 1, wherein the second layer is made of a polycarbonate.

5. A photoelectronic element including a heat-resistant transparent electrically conductive substrate, comprising a laminate of a second layer and two first layers on both sides of the second layer, and a conductive layer formed on either side of the first layers, said first layer being an optically transparent amorphous polymer obtained by a solvent casting method and having a glass transition temperature of not less than 180° C., said second layer polymer being an optically transparent amorphous polymer having a glass transition temperature of not less than 140° C. which is lower by not less than 20° C. than that of the glass transition temperature of said first layer polymer said substrate having a retardation of from 100 to 700 nm and a ray transmission of not less than 80%.

6. The photoelectronic element according to claim 5, wherein the first and second layers are directly laminated.

7. The photoelectronic element according to claim 5, wherein the first layer is made of an optically transparent polyarylate or polycarbonate, having aromatic groups in a principal chain.

8. The photoelectronic element according to claim 5, wherein the second layer is made of a polycarbonate.

9. A method of producing a photoelectric element including a heat-resistant transparent electrically conductive substrate comprising the steps of:

preparing the heat-resistant transparent electrically conductive substrate by laminating films of an optically transparent amorphous polymer constituting first layers obtained by a solvent casting method and having a glass transition temperature of not less than 180° C. on both sides of a film of an optically transparent amorphous polymer having a glass transition temperature of not less than 140° C. which is lower by not less than 20° C. than that of the glass transition temperature of said first layer polymer, constituting a second layer, forming an electrically conductive layer on a side of one of the first layers, the side being opposed to the second layer, whereby said substrate has a retardation of not more than 50 nm and a ray transmission of not less than 80%, and assembling the heat-resistant transparent electrically conductive substrate in the photoelectronic element.

10. The method according to claim 9, wherein a film constituting the first layer and the film constituting the second layer are heat laminated directly.

11. A method of producing a photoelectronic element including a heat-resistant transparent conductive substrate comprising the steps of:

preparing the heat-resistant transparent electrically conductive substrate by laminating films of an optically transparent amorphous polymer constituting first layers obtained by a solvent casting method and having a glass transition temperature of not less than 180° C. on both sides of a film of an optically transparent amorphous polymer having a glass transition temperature of not less than 140° C. which is lower by not less than 20° C. than that of the glass transition temperature of said first layer polymer, constituting a second layer, forming a conductive layer on either side of the first layers, whereby said substrate has a retardation of from 100 to 700 nm and a ray transmission of not less than 80%, and assembling the heat-resistant transparent electrically conductive substrate in the photoelectronic element.

12. The method according to claim 11, wherein a film constituting the first layer and the film constituting the second layer are heat laminated directly.

\* \* \* \* \*